April 30, 1929.  A. I. LINDEN  1,711,418
CHILD'S VEHICLE
Filed May 20, 1925  2 Sheets-Sheet 2
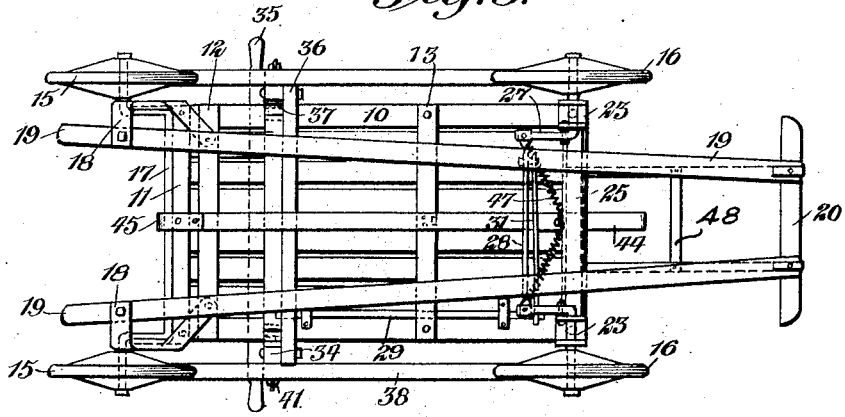
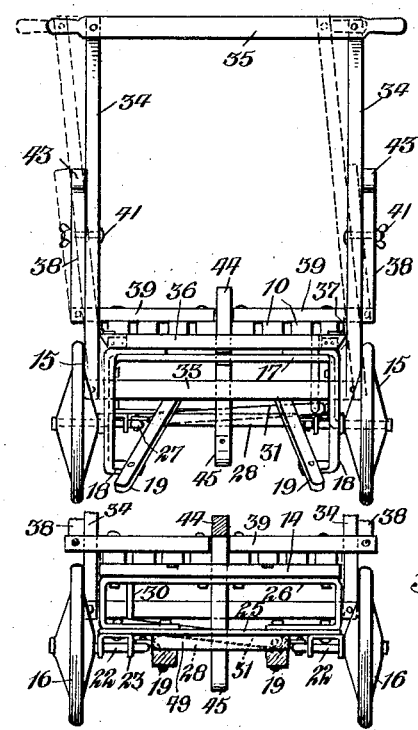
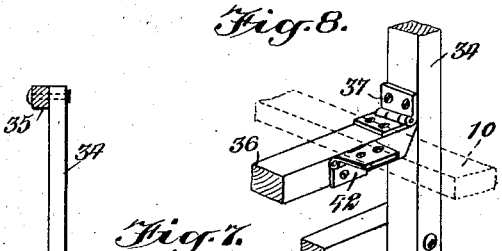
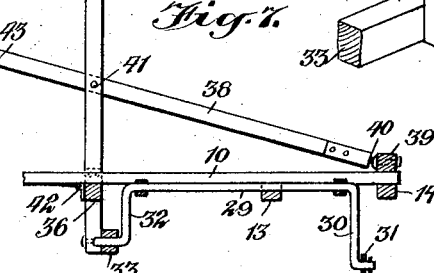
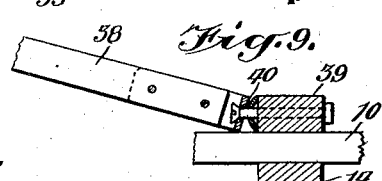
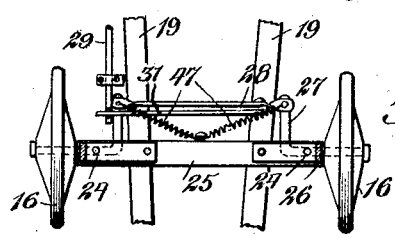
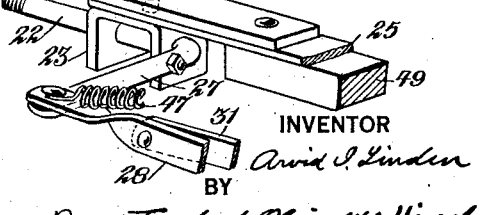

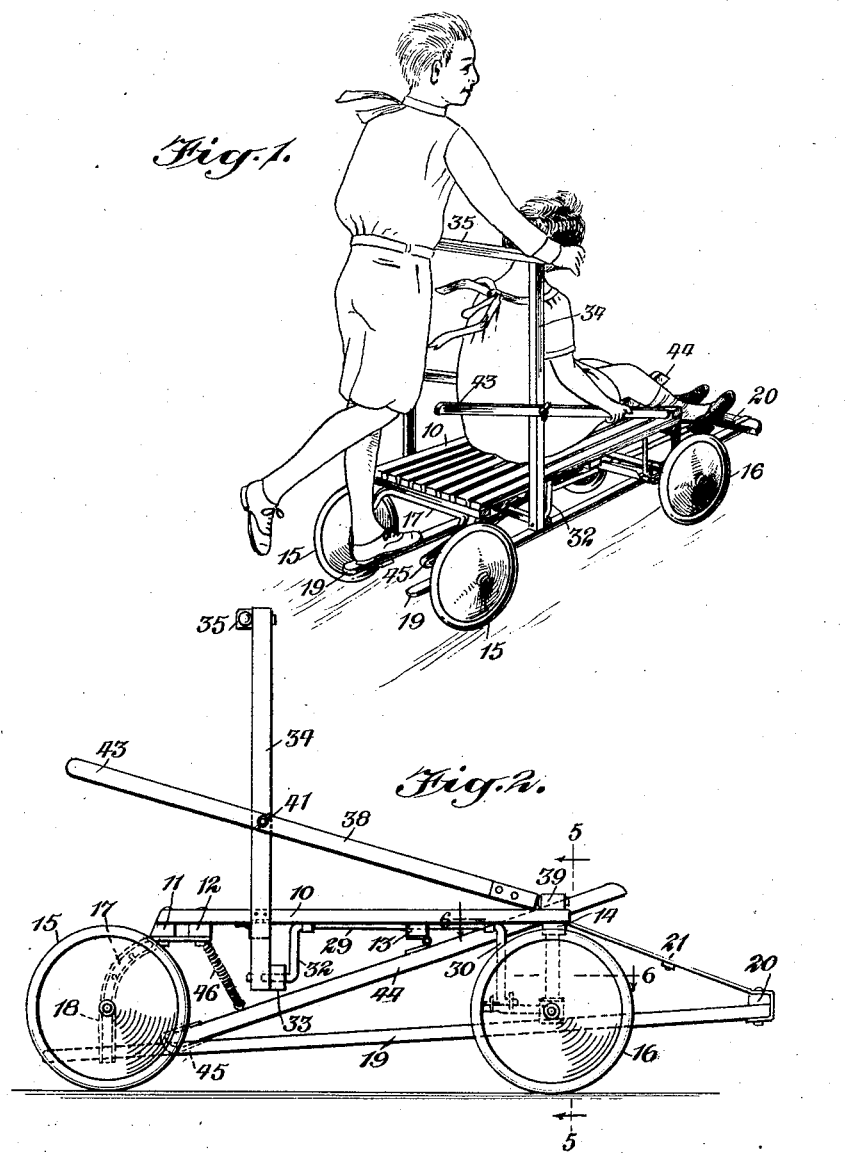

Patented Apr. 30, 1929.

1,711,418

UNITED STATES PATENT OFFICE.

ARVID I. LINDEN, OF BROOKLYN, NEW YORK.

CHILD'S VEHICLE.

Application filed May 20, 1925. Serial No. 31,477.

This invention is an improvement in vehicles adapted for children's use, and particularly for coasting.

The main object of the invention is to provide a vehicle so designed that it may be propelled by a child standing on the vehicle with one foot, and using the other for pushing on the ground.

As one important feature the vehicle is so designed that it may carry a second child as a passenger, or any desired load, and may be steered from the rear by the child propelling the vehicle.

As another important feature I provide improved steering means which may be operated either by the child propelling the vehicle or by the child riding thereon as a passenger.

As a further feature I provide means whereby the braking mechanism may be conveniently operated by either the passenger or the operator.

As a further feature I provide means whereby the support for the weight of the child propelling the vehicle is brought well below the axis of the wheels so that the stability of the vehicle is materially improved and the liability of overturning correspondingly decreased.

The steering mechanism and the brake may be controlled by the child riding as a passenger even though no other child is propelling the vehicle, as for instance when coasting down-hill.

The parts of my improved construction, in their preferred form, are so designed as to facilitate economical manufacture, render the assembly of the parts a simple and inexpensive operation, and permit convenient packing for shipping or storage. As all of the parts are of simple design they may be readily replaced in case of breakage.

Other important features and advantages will be apparent from the accompanying drawings and the following description.

In the accompanying drawings:

Fig. 1 is a perspective view.

Fig. 2 is a side elevation.

Fig. 3 is an inverted plan view.

Fig. 4 is a rear view, certain of the steering parts being shown in dotted lines in the position which they occupy in rounding a corner, Figs. 5 and 6 are sections on the lines 5—5 and 6—6 respectively of Fig. 2.

Fig. 7 is a longitudinal section showing certain parts of the steering mechanism.

Fig. 8 is a perspective view of a part of the steering mechanism.

Fig. 9 is a sectional detail, and

Fig. 10 is a perspective view of the steering knuckle and associated parts.

The main body portion of the vehicle includes a platform or seat which may be made up of a series of longitudinally extending, substantially parallel slats or strips of wood 10 which are shown as rigidly connected at the rear end by a pair of transverse slats 11 and 12, at the intermediate portion by a transverse slat 13, and at the front end by a slat 14. All of these transverse connected slats are preferably beneath the longitudinally extending slats 10.

A pair of rear wheels 15 and a pair of front wheels 16 are provided for supporting this platform or seat. These wheels may be of any desired character, for instance disk, wire, or wood, and may be provided with ball bearings, tires, and other features commonly employed in wheels for children's vehicles. All of the wheels may be of the same size, or the front wheels may be smaller than the rear wheels.

The rear wheels are shown as mounted upon an axle 17 which has its intermediate portion bent upwardly and forwardly out of alignment with the axis of the rear wheels, and so as to lie adjacent to the under side of the rear of the platform, which latter is preferably at approximately the height of the upper edges of the wheels.

For connecting the axle to the platform I provide braces or brackets 18 which are secured to the under side of the transverse slats 11 and 12, and extend rearwardly and downwardly therefrom. Thus the axes of the wheels are below and in the rear of the end of the platform, while the intermediate portion of the axle is closely adjacent to and directly beneath the rear end of said platform. This arrangement leaves a free space between the two rear wheels, the purpose of which will be pointed out hereinafter.

The brackets 18 extend below the axes of the rear wheels and at their lower ends serve to support a pair of slats 19 which extend lengthwise of the vehicle beneath the platform. These slats are materially longer than the platform and extend rearwardly beyond the brackets 18 and forwardly beyond the front end of the platform. The two slats are not directly connected at their rear ends, but at their front ends they are connected by a transverse bar 20 which serves as a foot rest for the passenger, as a bumper, and as a reinforcing brace. This foot rest is well in advance of the front end of the seat or platform, and is lower than the latter, and is connected to the front cross-slat 14 by a pair of downwardly and forwardly extending metal straps 21. The slats 19 at their rear ends are sufficiently wide so that a child may stand thereon with one foot on each slat as a foot rest, or may stand on one slat and propel the vehicle by pushing on the ground and rearwardly between the two slats. By this arrangement of the foot rest the brackets 18 and the bent axle 17, there is provided adequate space for the free movement of the propelling foot of the operator.

By virtue of the arrangement described, I obtain several structural advantages to wit: I employ a rear axle formed in a single piece in the manner specified so as to allow a free space between the two rear wheels affording free sway for the foot of the child standing at the rear of the vehicle upon slats 19 when propelling the vehicle. The rear axle therefore, also acts as a connecting tie rod between the two brackets 18 and constitutes a substantial transversal reinforcement for the entire structure. I also employ supports for the rear axle such as brackets 18 which also act at the same time as points of attachment for the longitudinal slats 19, which in their turn reinforce the structure in the longitudinal sense. Thus, a very strong and rigid construction is obtained in an excessively simple manner.

The position of the foot rest is calculated to assure the maximum of comfort and security for the child seated on the platform due to its being placed in a position lower than and well in advance of the seat provided by said platform. Another advantage of this construction lies in the fact that the foot rest thus provided is of a stationary nature and is entirely independent of the steering gear or of the front axle.

The front wheels 16 are so mounted that they may be skewed to steer the vehicle. The connection between the front wheels and the front of the platform is illustrated as including a pair of axle sections 22 (see Fig. 10) which are mounted in and rigidly connected to brackets 23. Each bracket is pivotally connected by a bolt 24 so as to turn about a vertical axis. The pivot bolts 24 connect the axle supporting brackets 23 to a transverse metal bar 25 which is rigidly connected to and spaced from the transverse slat 14 by a metal brace 26 having its intermediate portion secured to the under side of the slat 14 and its end portions bent downwardly and thence inwardly, and rigidly secured to the cross brace 25.

The axle portions 22 have rearwardly extending arms 27 constituting steering knuckles, and these are connected by a cross link 28 pivoted to the rear end of each so that the two wheels will be maintained in parallelism and may be skewed simultaneously.

The mechanism employed for operating the steering knuckles constitutes an important feature of my invention. This mechanism as shown includes a rock shaft 29 journaled upon the under side of one of the slats 10 or between two of them, and with its front and rear ends extending downwardly. The depending front end 30 is connected by a drag link 31 to link 28 adjacent to the opposite end of the latter, so that as the rock shaft 29 is oscillated, the drag link 31 will pull or push the connecting link 28 and steer the vehicle. It will be observed that by mounting the rock shaft 29 at one side of the vehicle frame, as shown, a maximum length is obtained for the drag link 31, with the result that a relatively small variation in the inclination of said drag link will occur even for a relatively large angular movement of the rock shaft; the transmission of movement from the rock shaft to the steering knuckle at the opposite side occurs therefore under the best efficiency conditions. The rear end 32 of the rock shaft extends into a cross bar 33 which pivotally connects the lower ends of two vertical steering bars 34. These latter extend to a considerable distance above the platform and are connected at their upper ends by a transversely extending handle 35. The two handle bars 34 intermediate of their upper and lower ends are hinged to the opposite ends of a transverse bar 36. The pintles of the hinges 37 extend lengthwise of the vehicle so that the upper and lower ends of the handle bars 34 have lateral or transverse movement, and when the upper ends of the handles are moved laterally in one direction the lower ends will be moved laterally in the opposite direction to oscillate the rock shaft 29 and skew the wheels in the same direction as that in which the upper ends of the handle bars 34 were moved. Thus the child propelling the vehicle may steer to the left or to the right by swaying his body in the direction in which he desires to turn, and thereby moving the handle bars in the direction in which he sways his body. This renders steering somewhat automatic, and increases the stability of the vehicle, as the natural tendency is to lean in the direction toward which the vehicle is to be steered.

Furthermore, an arrangement of this nature possesses other inherent advantages of a functional nature which play an important part in the operation of a device of this character. To begin with the control of the vehicle becomes almost instinctive instead of deliberate, because as stated, all the child at the rear has to do is to sway his body one way or the other and the steering mechanism will instantly respond and change the direction of travel of the vehicle accordingly.

In so doing, the child actually applies the force necessary to operate the steering mechanism by the sheer weight of his body, with practically no exertion whatever on his part. Furthermore, a good leverage is provided by using steering members having a comparatively long leverage, arranged so that they will not unduly project sidewise of the car. A long leverage is a very desirable condition providing as it does, a steering arrangement which is both sensitive and powerful, because it permits of exerting considerable force at the knuckle joints even when applying but a moderate pressure at the operating end.

In order to realize this condition, the steering levers need not necessarily be vertically directed; but in order to combine the advantages thus obtained from a long leverage together with an arrangement permitting of utilizing the rear end of the car for the operation of the steering member or members without interfering in the least with the useful loading space on the platform, the steering bar or bars are preferably pivotally mounted about longitudinally directed pivots at the rear end of the vehicle, so that the steering members may be arranged in a substantially vertical position as shown.

By virtue of this construction, the steering member or members do not interfere in the least with the swaying movements of the body of the child at the rear, and afford means for applying the steering action at the very best point within convenient reach of the child. At the same time, they also provide a firm hold for the child in a longitudinal sense because, while bars 34 are free to swing transversely of the vehicle they are held in substantially vertical position, that is, the upper ends are prevented from swinging forwardly or rearwardly by diagonal braces 38. These are connected at their front ends to transverse slat sections 39 secured to the upper side of the front end of the platform. The securing means is preferably a simple form of universal joint 40 which will permit a lateral swaying movement of the rear ends of the brackets 38 or will permit these brackets to be dropped down into parallelism with the platform upon the removal of the bolts 41 which connect these braces to the handle bars 34. The specific form of universal joint shown particularly in Fig. 9, includes a bolt extending through the section 30 and having its head loosely retained in the intermediate portion of a strap, the ends of which strap are secured to the opposite sides of the brace 38. These parts are disconnected preferably only for shipment or storage. To facilitate such shipment and storage the bar 36 is not rigidly secured to the under side of the platform but is connected thereto by hinges 42 which have their pintles extending transversely of the vehicle. Thus upon removing the bolts 41 the braces 38 may be dropped down on to the platform and the upper ends of the handle bars may be swung downwardly and forwardly to bring these bars substantially into parallelism with the platform. This swinging movement automatically disconnects the transverse bar 33 from the end of the rock shaft, as this end merely projects into a socket in the bar.

The braces 38 serve an additional and important function in that they constitute side bars or arms which the passenger may grasp, and they prevent any load which may be carried on the vehicle from slipping laterally off the platform. Furthermore the child riding on the platform may grasp these braces and move them laterally to steer the vehicle if the vehicle is not being propelled by another child standing at the rear. Also the braces 38 are preferably extended rearwardly beyond the steering handle bars 34 so that the rear ends 43 of these braces constitute handle bars which the child may grasp in pushing the vehicle if he does not care to operate it by standing with one foot on the foot rest 19. Also the child pushing the vehicle may pull downwardly and rearwardly on the rear ends of the handle bars 43 to lift the front wheels over an obstruction or on to the curb, or he may lift the rear end of the handle bars 43 to raise the rear end of the vehicle.

It will be observed that by means of this arrangement, I provide a novel and important feature in the nature of a steering mechanism which may be controlled either by the child standing at the rear or by the child seated upon the platform.

It is therefore possible for a child to run the car either by standing at the rear upon slats 19 or else by sitting upon the platform when coasting downhill. The usefulness and the amount of enjoyment afforded by the car are therefore noticeably increased owing to the flexibility of operation provided by this arrangement.

It will furthermore be observed that the braces 38 constitute in effect, an illustration of the point previously noted, that the steering members need not necessarily be arranged in a vertical position in order to realize the advantage of a long leverage, and still retain the advantage of the possibility of applying the necessary force by swaying the body of the operator rather than by exerting the force by hand and arm control. Braces 38, are practically steering members arranged in a longitudinal sense, and the combination of braces 38 and handle bars 34 constitutes a composite steering control structure operable either by the child at the rear, or by the child on the platform, in both cases a long leverage condition being obtained and the possibility of instinctive steering being also realized.

In other words, a powerful steering action is obtained by using steering members having a long leverage and said action is furthermore rendered almost automatic and instinctive by using laterally movable levers which permit of utilizing the swaying movements of the body of either child.

At the same time, the arrangement is made more sensitive and its capacity for steering intensified due to the fact that the movements of the body are apt to exert a much greater force at the operating end than the arm muscles of a child alone could command. A sensitive and powerful response of the steering apparatus is therefore secured, first by providing long leverage and second, by automatically increasing the force that a child can apply without undue exertion at the operating end of the steering mechanism. The safety and sensitiveness of the arrangement are furthermore increased by providing an arrangement which makes the steering action of the child automatic and instinctive.

The brake means illustrated includes a lever 44 which is hinged or pivoted intermediate of its ends to the transverse slat 13. The rear end of the lever comes between and slightly in advance of the rear wheels, and is provided with a shoe 45, while the front end extends between two of the slats 10 above the transverse slat 14, and projects above and beyond the front end of the platform. The child propelling the vehicle may easily place one foot on to the shoe 45 and press it down on to the ground so as to act as a brake, or the child sitting on the platform with his feet on the foot rest 20 will have the front end of the brake lever 44 approximately between his knees, so that he may grasp it and pull upwardly so as to force the brake shoe 45 against the ground. He may bring his full strength to bear on the brake lever as he may brace himself against the front foot rest or bumper 20 while pulling upwardly and rearwardly on the brake lever. The brake lever is normally held with the brake out of contact with the ground. Any suitable means may be employed for this purpose, as for instance a spring 46. A pair of springs 47 at the front end of the vehicle may serve to hold the front wheels normally in alignment with the rear wheels so that the vehicle will travel in a straight line, unless the steering handles are forcibly actuated.

The front braces may have an additional cross connection in the form of a bar 48 which may serve as a foot rest and brace for small children who cannot reach the bar 20. The slats 19 may be supported intermediate of their ends by being bolted to a cleat 49 on the under side of the bar 25.

It will be noted that the vehicle or coaster wagon may be used by one child sitting on the platform with the brake and steering levers conveniently positioned for operation, or may be operated by one child standing on the foot rest formed by the rear ends of the slats 19. It will be noted that these foot rests are below the axis of the rear wheels and may be somewhat in advance of this axis so that there is no tendency of the vehicle to turn over backwardly. The child standing on the foot rest may also operate the steering and brake mechanisms. The vehicle may be pushed or pulled, and may be used for carrying any desired load instead of a passenger. Preferably all of the slats are of the same width and thickness so that all of the wooden parts may be made from the same stock. All of the metal parts are of simple design which may be purchased at an ordinary hardware store, such as the hinges, springs, bolts, and so forth, or are of simple design, so that they may be conveniently duplicated at an ordinary blacksmith shop or garage. The brake shoe 45 may be of cast metal, and may be of any desired shape or design to offer the desired resistance when pressed against the ground.

Obviously various changes may be made in the details of construction without departing from the scope of my invention as defined in the appended claims. In the claims the term "platform" is used in its broad meaning to include any form of a seat for a child or support for any load to be carried.

Having thus described my invention, what I claim as new and desire to secure by Letters Patent is:—

1. A child's vehicle having a platform, a pair of substantially vertical levers pivotally mounted on substantially longitudinally directed pivots at opposite sides of said platform adjacent to their lower ends, and having their upper ends transversely movable in respect to the platform, and means for steering the vehicle in one direction upon moving the upper ends of the said levers in the same direction so as to utilize the normal swaying of the body of the rider in the direction of turning.

2. A child's vehicle having a platform, a lever pivoted thereto adjacent its lower end and extending upwardly therefrom at one side thereof, and adjacent to the rear end thereof, and means for steering the vehicle in one direction upon the upper end of said lever being moved in the same direction laterally of the axis of said vehicle so as to utilize the normal swaying of the body of the rider in the direction of turning.

3. A child's vehicle having a platform, an upwardly extending pivoted lever, a rock shaft extending lengthwise of said platform, means for connecting one end of said rock shaft to said lever, and means for connecting the opposite end of said rock shaft to a front wheel of the vehicle for steering the latter.

4. A child's vehicle having a platform provided with front and rear wheels, a rock shaft extending lengthwise of said platform, means connecting the front end of said rock shaft with said front wheels to steer the vehicle, a lever pivoted to said platform adjacent to the rear end thereof and having its upper end laterally movable, and means connecting said lever and the rear end of said rock shaft.

5. A child's vehicle having a platform provided with front and rear wheels, a rock shaft extending lengthwise of said platform, means connecting the front end of said rock shaft with said front wheels to steer the vehicle, a lever pivoted to said platform adjacent to the rear end thereof and having its upper end laterally movable, and a diagonal brace connected to said lever and normally preventing forward or rearward movement of said upper end.

6. A child's vehicle having a platform, a rock shaft extending lengthwise thereof, a front wheel having its axis movable about a vertical pivot to steer the vehicle, connections between said wheel and the front end of said rock shaft, a substantially vertical lever pivoted adjacent to the rear end of said platform, a diagonal lever pivotally connected adjacent to the front end of said vehicle and pivoted to said first mentioned lever, and connections between one of said levers and the rear end of said rock shaft.

7. A child's vehicle having a platform adapted to serve as a seat for a child to ride thereon, a foot rest at the rear of said platform upon which another child may stand, a front wheel bodily movable about a vertical pivot to steer the vehicle, a substantially vertical lever adjacent to the rear end of said platform, a diagonal brace connecting the front end of said platform and the upper portion of said lever, and connections between said lever and said wheel whereby the vehicle may be steered by the lateral movement of either the lever or said brace.

8. A childs' vehicle including a platform adapted to serve as a seat, a front wheel bodily movable about a vertical pivot for steering the vehicle, a pair of vertical levers operatively connected to the front wheel and pivoted to opposite sides of the platform adjacent the rear end, a cross bar connecting the upper ends of said levers, and a pair of braces connecting the upper portion of said levers with the front portion of said platform and forming side bars for said seat.

9. A child's vehicle including a platform adapted to serve as a seat, a front wheel bodily movable about a vertical pivot for steering the vehicle, a pair of vertical levers pivoted to opposite sides of the platform adjacent the rear end, a cross bar connecting the upper ends of said levers, and a pair of braces connecting the upper portion of said levers with the front portion of said platform and forming side bars for said seat, and connections between said front wheel and said levers for steering the vehicle upon lateral movement of the levers and braces.

10. A child's vehicle having a platform, a rear axle having its intermediate portions secured to the rear portion of said platform and its terminal wheel supporting portions disposed below and in the rear of the intermediate portion, a pair of foot supports below and in the rear of said platform and spaced apart to permit a child standing on either support to push on the ground between said supports, and a transversely movable steering lever terminating above the rear portion of the platform.

11. In a device of the class described, the combination with a vehicle frame provided with a foot stand at the rear thereof, and a steering mechanism, of two upwardly extending laterally movable steering control members mounted one at each side of said frame on longitudinally extending pivots, said control members having their operating ends extending to a point within convenient reach of a child standing on said foot stand, and a cross member providing an articulated connection between said two side control members.

12. In a device of the class described, the combination with a vehicle frame provided with a foot stand at the rear thereof, and a steering mechanism, of two upwardly extending laterally movable steering control members mounted on longitudinally extending horizontal pivots at the rear of said frame, one at each side thereof, said control members having their operating ends extending to a point within convenient reach of a child standing on said foot stand, and a cross member providing an articulated connection between said two side control members.

13. In a device of the class described, the combination with a vehicle frame provided with a foot stand at the rear thereof, and a steering mechanism, of an upwardly extending laterally movable steering control member mounted on a longitudinally extending horizontal pivot at the rear of said frame, said control member having its operating end extending to a point above said frame within convenient reach of a child standing on said foot stand, and a longitudinal brace connected to said member preventing front to rear displacement thereof.

14. In a device of the class described, the combination with a vehicle frame provided with a foot stand at the rear thereof, and a steering mechanism, of an upwardly extending steering control member mounted on a longitudinally extending horizontal pivot at the rear of said frame, said control member having its operating end extending to a point above said frame within convenient reach of a child standing on said foot stand, and a longitudinal brace connected to said member and transversely movable therewith, preventing front to rear displacement thereof.

15. In a device of the class described, the combination with a vehicle frame provided with a seating platform and a steering mechanism therefor, of two laterally movable steering control members, one at each side of said platform, operatively connected to said steering mechanism, said control members forming side railings for and being adapted to be forced outwardly by swaying of the body of the occupant of said platform.

16. In a device of the class described, the combination with a vehicle frame provided with a seating platform and a steering mechanism therefor, of two longitudinally extending laterally movable steering control members, one at each side of said frame, operatively connected to said steering mechanism, said control members forming side railings for said platform and being pivotally connected to said frame at one of the ends thereof.

17. In a device of the class described, the combination with a vehicle frame provided with a seating platform and a steering mechanism therefor, of two longitudinally extending laterally movable steering control members, one at each side of said frame, operatively connected to said steering mechanism, said control members forming side railings for said platform and being pivotally connected to the front end of said frame.

18. In a device of the class described, the combination with a vehicle frame provided with a seating platform, a steering mechanism therefor, and a foot stand extending at the rear of said platform, of two steering control members laterally movable in an upwardly directed plane mounted one at each side of said platform, operatively connected to said steering mechanism, said control members having their operating ends extending to the rear of said frame and being adapted to be independently operated by a child standing on said foot stand or by a child seated on the said platform.

19. In a device of the class described, the combination with a vehicle frame provided with a seating platform, a steering mechanism therefor, and a foot stand extending at the rear of said platform, of two steering control members laterally movable in an upwardly directed plane mounted one at each side of said platform, operatively connected to said steering mechanism, said control members having their operating ends extending to the rear of said frame and being adapted to be independently operated by a child standing on said foot stand, or by the swaying of the body of a child seated on the said platform.

20. In a device of the class described, the combination with a vehicle frame provided with a seating platform, a steering mechanism therefor, and a foot stand extending at the rear of said platform, of two laterally movable steering control members mounted one at each side of said platform, said control members having their operating ends extending to the rear of said frame and being adapted to be independently operated by a child standing on said foot stand or by a child seated on the said platform, and two upwardly extending additional steering control members mounted on longitudinally extending horizontal pivots at the rear of said frame, one at each side thereof, operatively connected to said steering mechanism, said upwardly extending members having their operating ends extending to a point within convenient reach of a child standing on said foot stand, each upwardly extending member being operatively connected to one of the previously mentioned steering control members on the same side of said platform.

21. In a device of the class described, the combination with a vehicle frame provided with a seating platform, a steering mechanism therefor, and a foot stand extending at the rear of said platform, of two longitudinally extending laterally movable steering control members, one at each side of said platform, said steering control members being pivotally connected to the front end of said frame, and extending to the rear of said frame, said members being adapted to be independently operated by a child standing on said foot stand, or by a child seated on the said platform, and two upwardly extending steering control members mounted on longitudinally extending horizontal pivots, one on each side of said frame at the rear thereof, operatively connected to said steering mechanism, said upwardly extending members having their operating ends extending to a point within convenient reach of a child standing on said foot stand, and being operatively connected to said longitudinally extending steering control members.

22. In a device of the class described, the combination with a vehicle frame provided with a seating platform, a foot stand extending at the rear thereof, and a steering mechanism therefor, of steering control means independently operable by a child standing on said foot stand or by a child seated on said platform, and braking means mounted on said frame, also independently operable by either child.

23. A child's vehicle having a platform, a pair of upwardly extending levers connected together, pivotally mounted one at each side of said platform so as to be movable transversely of the vehicle in a plane intersecting the plane of said platform, a steering wheel, and operative connections between said wheel and said levers.

24. A child's vehicle having a platform, a foot support below and in the rear thereof, a steering lever secured onto said platform adjacent the rear end thereof, said lever being movable transversely of the vehicle in a plane intersecting the plane of said platform, and having a portion serving as a hand hold for a child standing on said foot support, and being restrained against forward or rearward movement, and steering mechanism connected to said lever.

25. A child's vehicle including a platform, front and rear wheels, a foot support below and in the rear of the platform, a pair of handle bars mounted at opposite sides of said platform adjacent the rear end thereof, upwardly extending therefrom, said handle bars being movable transversely of the vehicle about their points of attachment, in a plane intersecting the plane of said platform, a cross bar connecting said handle bars, and means connecting the lower ends of said handle bars with said front wheels for steering the vehicle.

26. A child's vehicle having a platform, a foot support below and in the rear thereof, an upwardly directed member secured to said platform adjacent the rear end thereof, said member having a portion serving as a hand hold for a child standing on said foot support and being movable transversely of the vehicle in a plane intersecting the plane of said platform, a front supporting member bodily movable about a vertical pivot for steering the vehicle, and operating connections between said front supporting member and said upwardly directed member.

27. A child's vehicle including a platform, front and rear wheels, a pair of foot supports below and in the rear of the platform and below the axis of the rear wheels, an upwardly directed member adjacent the rear end of the vehicle, said member being adapted to be grasped by the child standing on the foot support and being movable transversely of the vehicle in a plane intersecting the plane of said platform, and means connecting said member and the front wheels for steering the vehicle.

28. A child's vehicle including a platform, a pair of foot supports below and in the rear of said platform spaced apart to permit a child to stand with one foot on either support and treadle on the ground with the other foot between said supports, a handle bar upwardly extending adjacent to the rear end of the vehicle, said bar being movable transversely of the vehicle in a plane intersecting the plane of said platform, and steering mechanism connected to said handle bar.

29. In a device of the class described, the combination with a vehicle frame provided with a foot stand at the rear thereof, and a steering mechanism, of a steering control member operatively associated with said steering mechanism, having its operating end extending above said frame to the rear thereof, within convenient reach of a child standing on said foot stand, said control member being movable transversely of the vehicle and causing said steering mechanism to steer the vehicle to the side towards which the movement of said control member occurs.

30. In a device of the class described, the combination with a vehicle frame provided with a foot stand at the rear thereof, and a steering mechanism, of an upwardly extending steering control member pivotally mounted on said frame, said control member being movable transversely of the vehicle in a plane intersecting the plane of said platform, and having its operating end extending to a point above said frame within convenient reach of a child standing on said foot stand.

31. In a device of the class described, the combination with a vehicle frame provided with a foot stand at the rear thereof, and a steering mechanism, of a steering control member pivotally mounted on said frame so as to be movable transversely of the vehicle in a substantially vertical plane, said control member having its operating end extending above said frame to the rear thereof, within convenient reach of a child standing on said foot stand.

32. In a device of the class described, the combination with a vehicle frame provided with a foot stand at the rear thereof, and a steering mechanism, of an upwardly extending steering control member pivotally mounted on said frame, said control member being movable transversely of the vehicle in a plane intersecting the plane of said platform, and having its operating end extending to a point above said frame within convenient reach of a child standing on said foot stand, and means for reinforcing said member providing frontward or rearward displacement thereof.

Signed at New York in the county of New York and State of New York this 18th day of May A. D. 1925.

ARVID I. LINDEN.